United States Patent
Chen et al.

(10) Patent No.: US 7,496,341 B2
(45) Date of Patent: Feb. 24, 2009

(54) DEVICE AND METHOD FOR PROVIDING DC-OFFSET ESTIMATION

(75) Inventors: Wei-Hong Chen, Rancho Palos Verdes, CA (US); Huashih Lin, San Gabriel, CA (US); Wei-Chung Peng, Rancho Palos Verdes, CA (US)

(73) Assignee: Integrated System Solution Corp., Hsinchu (TW)

( * ) Notice: Subject to any disclaimer, the term of this patent is extended or adjusted under 35 U.S.C. 154(b) by 567 days.

(21) Appl. No.: 11/089,075

(22) Filed: Mar. 24, 2005

(65) Prior Publication Data

US 2006/0217069 A1 Sep. 28, 2006

(51) Int. Cl.
*H04B 1/10* (2006.01)

(52) U.S. Cl. ............... 455/311; 455/296; 455/226.1

(58) Field of Classification Search ............ 455/296, 455/305, 324, 334, 41.2, 67.11, 67.13, 550.1, 455/226.1, 284, 283, 310, 311
See application file for complete search history.

(56) References Cited

U.S. PATENT DOCUMENTS

| | | | |
|---|---|---|---|
| 6,816,712 B2 * | 11/2004 | Otaka et al. ............... 455/83 |
| 2003/0100286 A1 * | 5/2003 | Severson et al. ............ 455/324 |
| 2003/0199264 A1 * | 10/2003 | Holestein et al. ............ 455/324 |
| 2004/0043744 A1 * | 3/2004 | Schlegel et al. ............. 455/324 |
| 2004/0063417 A1 * | 4/2004 | Binshtok et al. ............ 455/314 |
| 2005/0042001 A1 * | 2/2005 | Shinohara et al. ........... 399/301 |
| 2005/0136874 A1 * | 6/2005 | Yeo et al. .................... 455/296 |
| 2005/0208919 A1 * | 9/2005 | Walker et al. ............... 455/296 |
| 2006/0135111 A1 * | 6/2006 | Jensen ........................ 455/334 |

OTHER PUBLICATIONS

Gustavsson, M., et al., "CMOS Data Converters for Communications" Kluwar Academic Publishers, Boston, pp. 229-232 (2000).
Razavi, B., "RF Microelectronics", Prentice-Hall PTR, New Jersey, pp. 129-132 (1998).
IEEE Standards 802.11a, High-Speed Physical Layer in the 5-GHz Band (1999).
IEEE Standards 802.11g, Further Higher Data Rate Extension in the 2.4 GHz Band (2003).

* cited by examiner

*Primary Examiner*—Blane J Jackson
(74) *Attorney, Agent, or Firm*—Alston & Bird LLP

(57) ABSTRACT

A communication system may include an equalizing device for DC-offset mitigation. The system includes: an input analog-to-digital converter configured to receive an input signal and produce a digital signal from the input signal; and a DC-offset estimation device coupled with the input analog-to-digital converter. The DC-offset estimation device is configured to produce a quantized DC-offset estimate from the digital signal. And the input analog-to-digital converter is configured to receive the quantized DC-offset estimate and to adjust a DC offset of the digital signal.

16 Claims, 6 Drawing Sheets

DEVICE AND METHOD FOR PROVIDING DC-OFFSET ESTIMATION

FIELD

The present invention relates to equalizing devices and methods. More particularly, the present invention relates to methods and devices for DC-offset mitigation that are applicable to process wireless communication signals.

BACKGROUND

In the field of communication and signal processing, DC (direct current) offset signifies at least the offset in the DC component of a signal. Although some DC offsets may be introduced intentionally for various purposes, other DC offsets may be undesired results occurred during transmission or signal processing. For example, DC offsets may be introduced during signal processing at a WLAN (wireless local area network) receiver, which may connect a computing device with a network via an access point.

Without limiting the scope of the invention, we describe below the signal processing of a WLAN receiver to illustrate an example of DC offset. Generally, a WLAN receiver may down-convert a radio frequency ("RF") signal to an intermediate frequency ("IF") signal, and then down-convert the IF signal to baseband ("BB") signal. Such receiver structure is also known as super-heterodyne, which may require an additional IF surface-acoustic-wave ("SAW") filter. To eliminate the IF stage, a direct conversion receiver may directly down-convert an RF signal to a BB signal. This receiver structure may achieve cost reduction by avoiding IF components, such as a SAW filter. However, undesirable, and sometimes significant, direct current (DC) offset may be introduced by a local oscillator and associated leakage.

Undesirable DC offset may affect the quality of processed signals and impact signal transmissions, such as signal transmissions through a wireless receiver.

Therefore, there is a need for a method or a device that reduces or mitigates DC offset, including DC offset in a direct conversion WLAN receiver.

SUMMARY

In one example, a communication system may conduct DC-offset mitigation, and the system includes: an input analog-to-digital converter configured to receive an input signal and produce a digital signal from the input signal; and the DC-offset estimation device coupled with the input analog-to-digital converter. In particular, the DC-offset estimation device is configured to produce a quantized DC-offset estimate from the digital signal. In addition, the input analog-to-digital converter is configured to receive the quantized DC-offset estimate and to adjust a DC offset of the digital signal.

An exemplary input analog-to-digital converter may be a pipeline analog-to-digital converter having a plurality of analog-to-digital converter stages. An analog-to-digital converter stage may include: a sample-and-hold circuit configured to receive the input signal and to produce a sampled output; a gain amplifier coupled to the sample-and-hold circuit and configured to amplify the sampled output to produce an amplified output; a first analog-to-digital converter coupled to the sample-and-hold circuit and configured to produce a first digital output; a first digital-to-analog converter coupled to the first analog-to-digital converter and configured to produce a first analog output; and a summing node coupled to the gain amplifier and the first digital-to-analog converter. The summing node is configured to receive an analog DC-offset estimate and to subtract the first analog output and the analog DC-offset estimate from the amplified output to produce an adjusted output.

In another example, a WLAN direct conversion device may include DC-offset mitigation. The WLAN conversion device includes: a base-band receiver; a local oscillator; a first signal-processing branch being coupled to an input, to the local oscillator, and to the base-band receiver; a second signal-processing branch being coupled to the input, to the local oscillator through a 90-degree phase shifter, and to the base-band receiver; a first DC-offset estimation circuit coupled to the first branch and the base-band receiver; and a second DC-offset estimation circuit coupled to the first branch and the base-band receiver.

In another example, a DC-offset mitigation method for a communication system includes: receiving an input signal; estimating a DC offset of the analog input signal; quantizing the estimated DC offset to produce a quantized DC-offset estimate; and producing from the input signal an adjusted digital signal. The adjusted digital signal has been adjusted with a DC-offset level approximating the quantized DC-offset estimate.

In another example, an equalizing device includes a first filter, a target filter, an error determining device coupled with the first filter and the target filter, and a coefficient processor coupled with the error-determining device. The first filter has a first set of coefficients and processes input signals transmitted through a communication channel to reduce a channel response. The target filter has a second set of coefficients and generates a target channel response. The error-determining device then processes output signals from the first filter and the target filter to generate error signals. The coefficient processor maintains constant at least one coefficient of the first or the second sets of coefficients and updates the remaining coefficients of the first and the second sets of coefficients based on the error signals.

DETAILED DESCRIPTION OF THE INVENTION

Figure 1A:
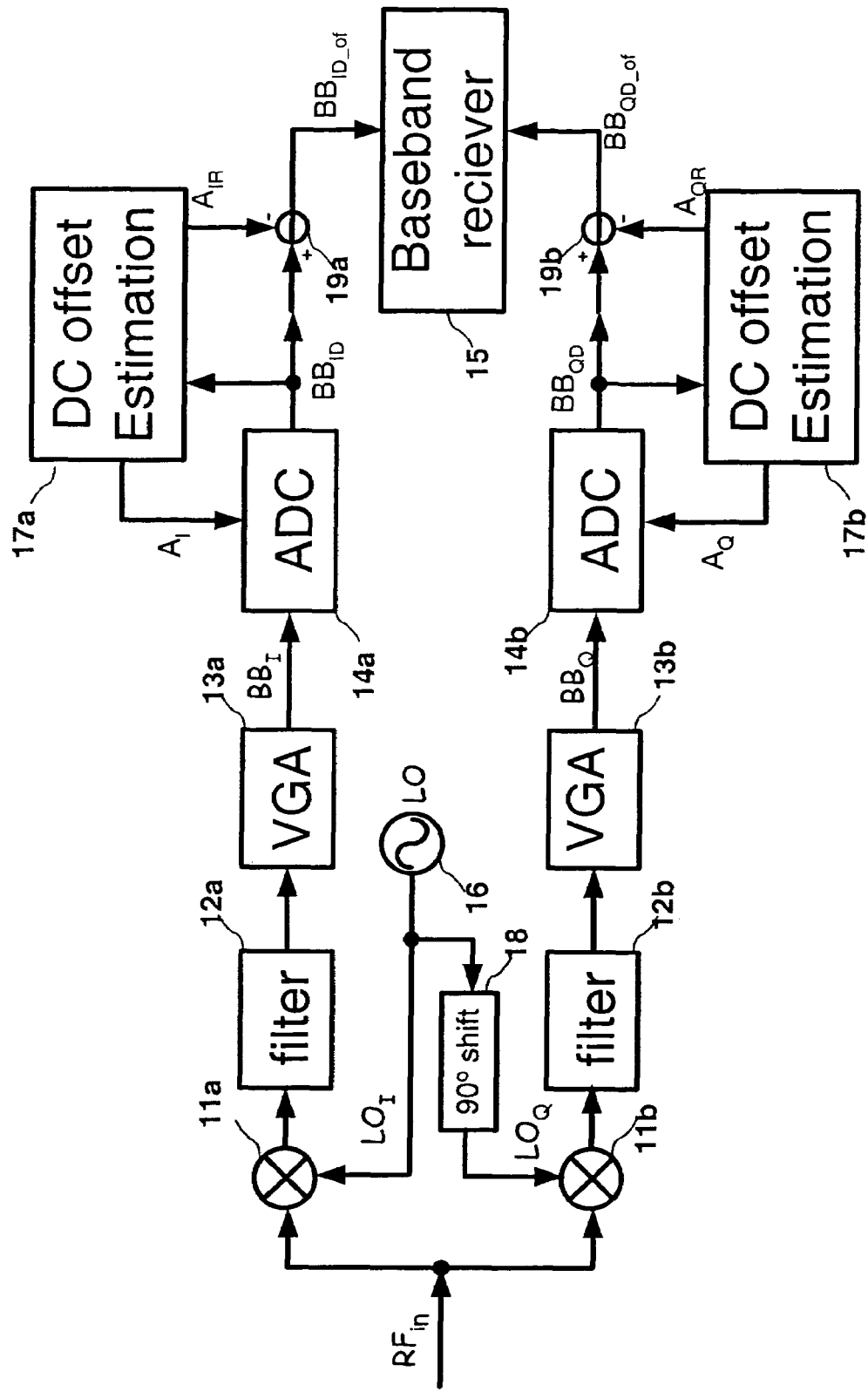
FIG. 1A is a schematic block diagram illustrating a DC-offset mitigation device in one example.

Reference will now be made in detail to embodiments of the invention, examples of which are illustrated in the accompanying drawings.

Examples of the invention include methods and devices for DC-offset mitigation, such as for DC-offset mitigation in a direct conversion wireless receiver. One example may provide an efficient DC-offset-mitigation method or device without requiring a high resolution ADC. In some examples, DC-offset estimation may be conducted during the transmission of a short training symbol of an input signal or an incoming data packet. Some examples may also allow DC-offset adjustment to be distributed into several stages in a pipelined analog-to-digital converter and may enable a simple circuit implementation, achieve good offset adjustment resolution, and/or provide a good offset adjustment range. Some other examples may provide adequate receiver performance without requiring complicated circuits.

Without limiting the scope of the present invention, the following will describe a DC mitigation device and method using an exemplary application in a wireless receiver, such as a wireless receiver operable under the 802.11 standards of IEEE.

Depending on the circuit design and other design considerations, DC offset may be mitigated in several ways. For example, DC offset can be cancelled by applying a high-pass filter ("HPF") before an analog-to-digital converter ("ADC"). The technique, also known as alternating current ("AC") coupling, may filter out some non-DC signals. This approach may require a trade-off between expediting DC-offset mitigation (high HPF corner frequency) and preserving signal spectrum integrity (low HPF corner frequency). However, with WLAN standards allowing 20-ppm frequency error for 802.11a WLAN devices and 25-ppm frequency error for 802.11g WLAN devices, it becomes a challenge to use AC coupling while maintaining signal integrity.

Another DC-offset reduction technique is DC coupling, which may cancel DC offset digitally, i.e. after the ADC, by digitally estimating the DC offset and subtracting it from the digital signals. However, when DC offset is estimated and subtracted after the ADC, the technique sometimes may cause unnecessary signal clipping. To avoid this problem, additional ADC dynamic range can be allocated to avoid clipping DC-biased signals. However, a higher-resolution ADC may be needed for providing the additional ADC dynamic range, which may require a greater chip area and consume more power.

To reduce DC offset in a WLAN receiver, both AC coupling and DC coupling techniques may be used in sequence, and the combination may better meet performance and resolution requirements. For example, AC coupling may be used first to reduce DC-offset magnitude, so the remaining DC offset is small compared to the signal level for an automatic-gain-control ("AGC") process and/or a coarse-frequency-estimation process to work properly. After both AGC and coarse frequency estimation are performed, DC coupling may then be activated for further DC-offset mitigation. With proper DC-offset mitigation, DC coupling can now be used for decoding the packet with minimal signal distortion near DC.

For a direct conversion receiver using CMOS technologies, many sources can contribute to the DC offset. In one embodiment, an RF IC may generate a DC offset. For example, a WLAN standards IEEE 802.11g OFDM (orthogonal frequency division multiplexing) or an WLAN 802.11a receiver has to complete separate processing, including AGC, coarse frequency estimation, and DC-offset adjustment, within 8 μs when ten short training symbols ("STS") are received at the beginning of a packet. An effective use of this short time period frequently becomes an important design consideration for an 802.11g or 802.11a WLAN receiver.

In one embodiment consistent with the present invention, a receiver may allocate about 2~4 μs for AGC and about 2~4 μs for coarse frequency estimation. Large DC offset in a direct conversion receiver may cause an AGC process to settle at a non-optimal level. To facilitate AGC and coarse-frequency-estimation processing, an RF IC may be set to an AC coupling mode at the beginning to minimize the impact caused by DC offset. After the AGC and coarse-frequency-estimation processing, the RF IC may then be set to a DC coupling mode to minimize signal distortion. In one embodiment, it may take about 1 μs for estimating the DC offset.

In one embodiment, a DC-offset estimation can be conducted during the STS (short training symbol) period, so its Peak to Average Ratio ("PAR") will not cause clipping in an ADC and a digital estimation can be performed reliably. This estimated DC offset may be quantized to digital levels, and the quantization levels may be selected to properly cover the dynamic range of DC offsets. Additionally, the quantization levels may be selected to make a residual DC offset level much less than the signal level. The estimated DC offset level may be transmitted to the ADC. During the guard time for the two Long Training Symbols ("LTS"), the ADC may adjust the DC offset at the front stages of the ADC.

FIG. 1A is a schematic block diagram illustrating a DC-offset mitigation device in embodiments consistent with the present invention. In one embodiment, the DC-offset mitigation device may be used in a communication system, such as a WLAN receiver system 100. For example, system 100 may receive an input signal, such as RF signal $RF_{in}$ with a carrier frequency at $f_c$. A pair of mixers 11a and 11b at carrier frequency $f_c$ may convert this received signal to baseband I and Q signals. A pair of channel filters 12a and 12b are connected to the mixer outputs to provide adjacent channel interference mitigation. Variable gain amplifiers 13a and 13b may be used to adjust the received signal level for providing an adequate ADC dynamic range.

I and Q ADCs (analog-to-digital converters) 14a and 14b may be used to convert the received I and Q signal, $BB_I$ and $BB_Q$ respectively, to discrete signals, $BB_{ID}$ and $BB_{QD}$ respectively. Two DC-offset estimation circuits 17a and 17b may take the I-channel and Q-channel ADC samples, estimate the DC offsets for I-channel and Q-channel, denoted $I_{DC}$ and $Q_{DC}$, respectively. The DC offset can be estimated by averaging the signals over a period of time, for example. The estimated DC-offset values may be quantized before being fed back to the ADC circuitry for DC-offset adjustment of the I- and Q-channel at the front stage of the ADC. The quantized values are respectively denoted as $A_I$ and $A_Q$ in FIG. 1A.

In one embodiment, $A_I$ and $A_Q$ may be presented in a digital form, and each may include three bits: $D_{os\_cr}(S)$, $D_{os\_cr}(1)$, $D_{os\_cr}(2)$, which will be discussed below.

For each of the I and Q channels, the ADC circuitry blocks 14a and 14b may use corresponding digital DC-offset compensation values, such as $A_I$ and $A_Q$, to determine if input level adjustment is needed at each pipelined stage. The residual DC offsets in the I- and Q-channels, denoted $A_{IR}$ and $A_{QR}$, are calculated in blocks 17a and 17b using the following equations:

$$A_{IR} = I_{DC} - A_I$$

$$A_{QR} = Q_{DC} - A_Q$$

These two signals may be respectively fed to a pair of subtractors 19a and 19b which may cancel residual DC offsets digitally:

$$BB_{ID\_of} = BB_{ID} - A_{IR}$$

$$BB_{QD\_of} = BB_{QD} - A_{QR}$$

In some embodiments, if the DC-offset estimation is perfect, then the two resultant signals, $BB_{ID\_of}$ and $BB_{QD\_of}$, are now DC-offset-free before being sent to base-band receiver 15 for further processing. For the rest of the packet, the DC-offset estimation devices 17a and 17b may be used to continuously estimate the residual DC and update $A_I$ and $A_Q$ values and $A_{IR}$ and $A_{QR}$ values for DC-offset cancellation. Alternatively, because a packet is usually short, the same DC-offset estimates may be used for the rest of the packet, and the same $A_{IR}$ and $A_{QR}$ values initially estimated during the STS may be continually used throughout the packet.

Figure 1B:
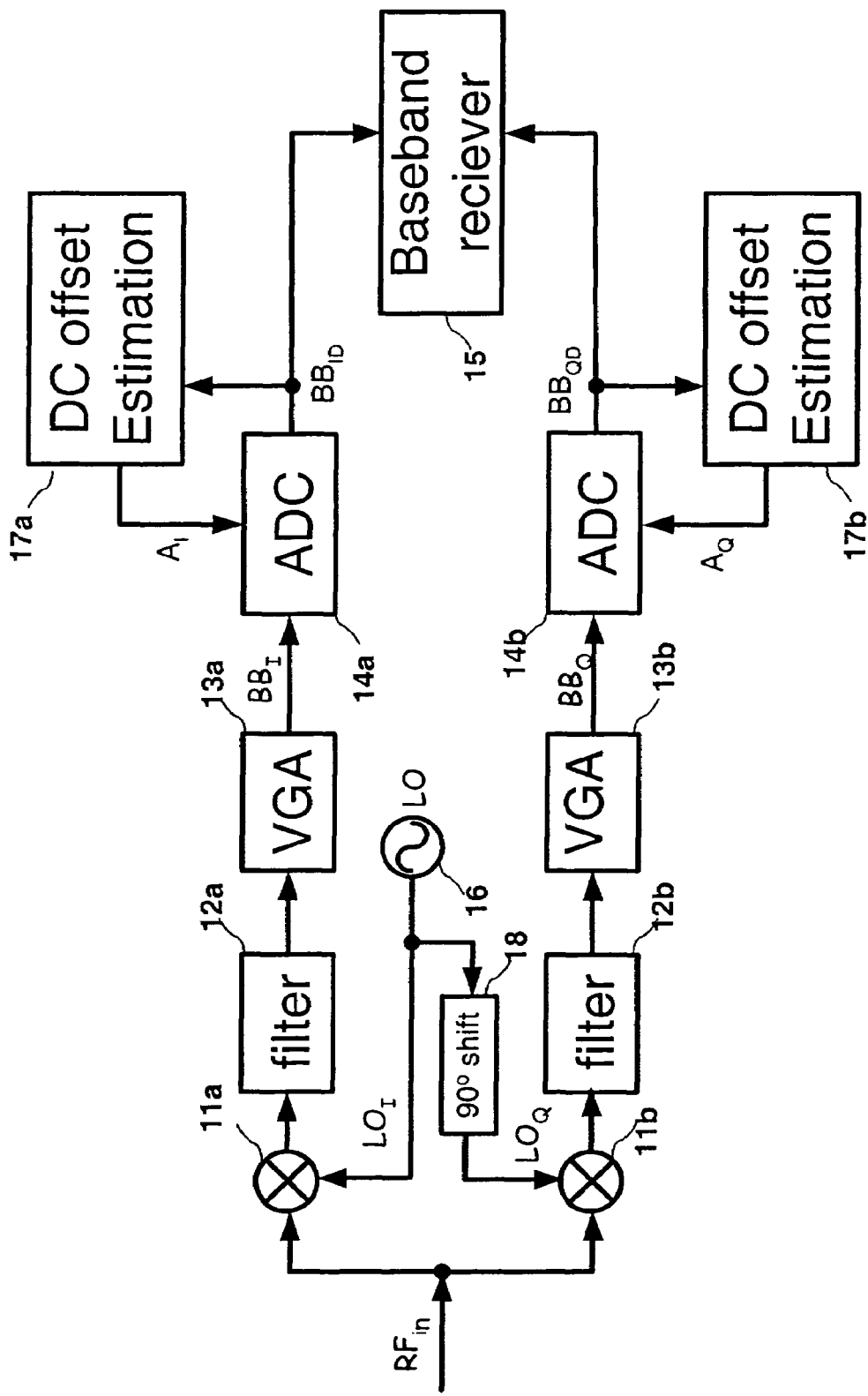
FIG. 1B is a schematic block diagram illustrating a WLAN direct conversion receiver with DC-offset mitigation in one example.

In one embodiment, a simpler implementation of DC offset may be used. Referring to FIG. 1B, a schematic block diagram illustrating a WLAN direct conversion receiver with DC-offset mitigation, signals, $BB_{ID}$ and $BB_{QD}$, are used for base-band receiver processing without considering residual DC offsets noted above. Such design may be used when the residual DC offset has insignificant impact on the receiver decoding performance or when the cost or circuit simplicity is a significant design consideration. In addition, additional circuitry blocks may be added before ADC blocks 14a and 14b so the receiver can switch between AC coupling and DC coupling modes.

More details are given below to illustrate the receiver architecture for DC-offset mitigation according to a specific embodiment of the invention. The illustration will cover (1) system design trade-off, (2) DC adjustment at each pipelined ADC stage, and (3) the distribution of DC offset into multiple pipelined ADC stages.

Merely by way of an example, to achieve proper 802.11g (or 802.11a) orthogonal frequency division multiplexing (OFDM) receiver performance, the whole ADC block 14a in FIG. 1 will assume a 1V peak-to-peak input with a 9-bit output. A conventional method for reducing DC offset is to use a 10-bit ADC with larger ADC input range in the 9-bit receiver. But that may be a costly solution in some embodiments because of the additional hardware required. In one embodiment, DC-offset reduction can be achieved using a 9-bit ADC with minimal additional circuitry. The DC-offset estimation may be performed using the OFDM short training symbols (STS). The STS may be designed to have small peak-to-average ratio (PAR). Simulation results indicate that the PAR for short training symbols (STS) in various multipath environments is around 8.5 dB. The Automatic Gain Control (AGC) will adjust the gain of VGA's, so the ADC input has a root-mean-square (RMS) voltage of 120 mV nominal. This may give allowance for a PAR of over 10 dB, which is common for the rest of an OFDM data packets. For illustrative purposes, we may assume that the DC offset at the ADC input is in the range of (−110 mV to 110 mV) in one embodiment. Given a PAR of 8.5 dB, the signal peaks at around ±320 mV in the absence of DC offset. With a worst case DC offset of ±110 mV, the peak of the signal becomes ±430 mV at the input of ADC blocks 14a or 14b. Since it is still smaller than ±500 mV by 70 mV, the DC-offset estimation may be free of clipping effect in this embodiment. The 70 mV also serves as a margin for the AGC error. In other words, the AGC circuitry can converge to 1.5 dB above the target level, and there is still no clipping during DC-offset estimation for a DC offset of ±110 mV.

In one embodiment, an example design may quantize the estimated DC offset to 0, ±31.25 mV, ±62.5 mV or ±93.75 mV, and use 3 bits to represent the digitized DC offset which will be sent to the ADC (please refer to Table 4 and related descriptions below). The ADC may adjust the input level by 0, ±31.25 mV, ±62.5 mV or ±93.75 mV, accordingly, to mitigate the DC offset. If the DC-offset estimation error is negligible, the residual DC offset may be about 16 mV or less. With a small residual DC offset, the probability of clipping at the input of the ADC may be greatly reduced for the rest of the data packet having a typical PAR over 10 dB. On the other hand, if one uses the long training symbols (LTS) period to do the DC-offset estimation, then the peak of the signal may become higher than ±489 mV. This may leave no margin for the AGC error.

In the embodiment described above, DC offset needs to be cancelled during the STS period when the PAR is smaller. Specific ADC ranges and DC-offset ranges are used to show that certain error margin needs to be reserved for AGC error tolerance. Although the above analysis used specific ADC and DC-offset ranges to show design trade-offs, one skilled in the art may vary or optimize the design for different DC-offset ranges.

Figure 2A:
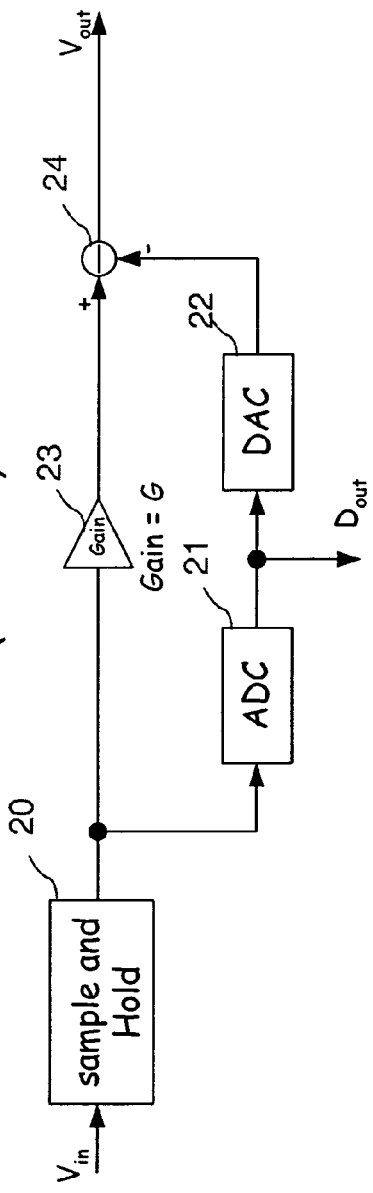
FIG. 2A is a schematic block diagram illustrating a pipelined ADC stage without DC-offset mitigation.
Figure 2B:
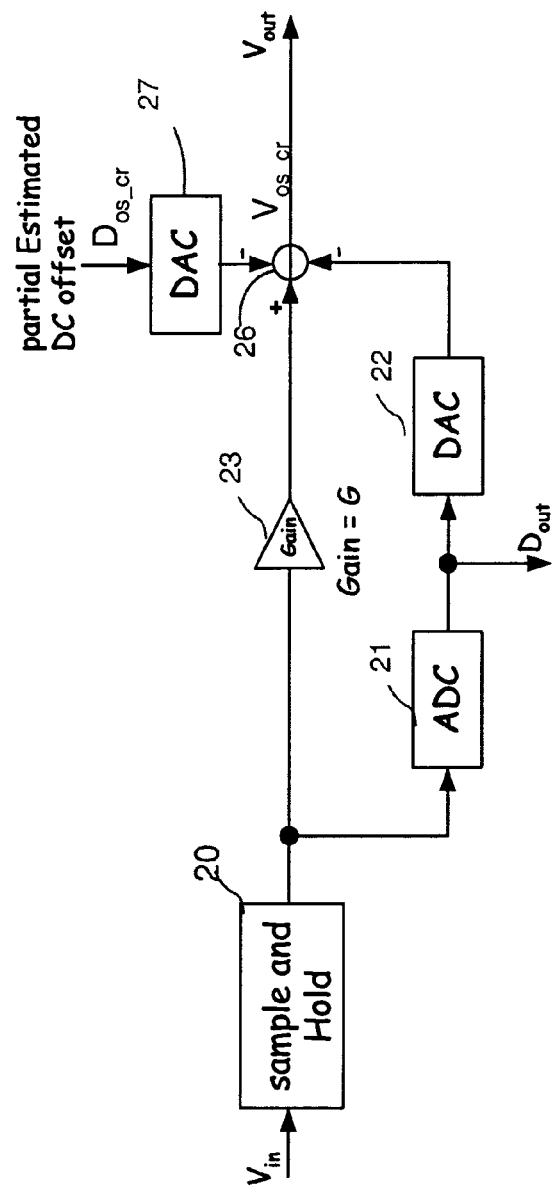
FIG. 2B is a schematic block diagram illustrating a pipelined ADC stage including DC-offset mitigation in one example.

The following will discuss an exemplary implementation of DC-offset adjustment at pipelined ADC stages. FIG. 2A is a schematic block diagram illustrating an ADC stage without DC-offset mitigation. FIG. 2B is a schematic block diagram illustrating an ADC stage involved in ADC blocks 14a and 14b, including DC-offset mitigation. Referring to FIG. 2B, the input signal, $V_{in}$, may be sampled and held by sample-and-hold device 20, and the held (or sampled) value may be quantized by ADC 21 to generate the partial bits, $D_{out}$, of the digital output of the whole ADC. ADC 21 may be a low resolution ADC. The held value may also be amplified by gain amplifier (gain block) 23 and subtracted by the analog value of the digital output, $D_{out}$ provided by DAC (digital-to-analog converter) 22. DC-offset reduction is accomplished by summing node (subtraction port) 26, and DAC 27 may be used to convert the digitally represented DC-offset adjustment value $D_{os\_cr}$ into the corresponding analog representation $V_{os\_cr}$. Compared to block 24 in FIG. 2A, an extra subtractor port in block 26 may used to remove the DC offset in the analog signal "$V_{in}$" at the input of the pipelined ADC stage. The subtractor may be implemented by using a switched capacitor circuit with a pipelined ADC circuit, and the DC offset may be subtracted at the same time with the DAC output.

Figure 3:
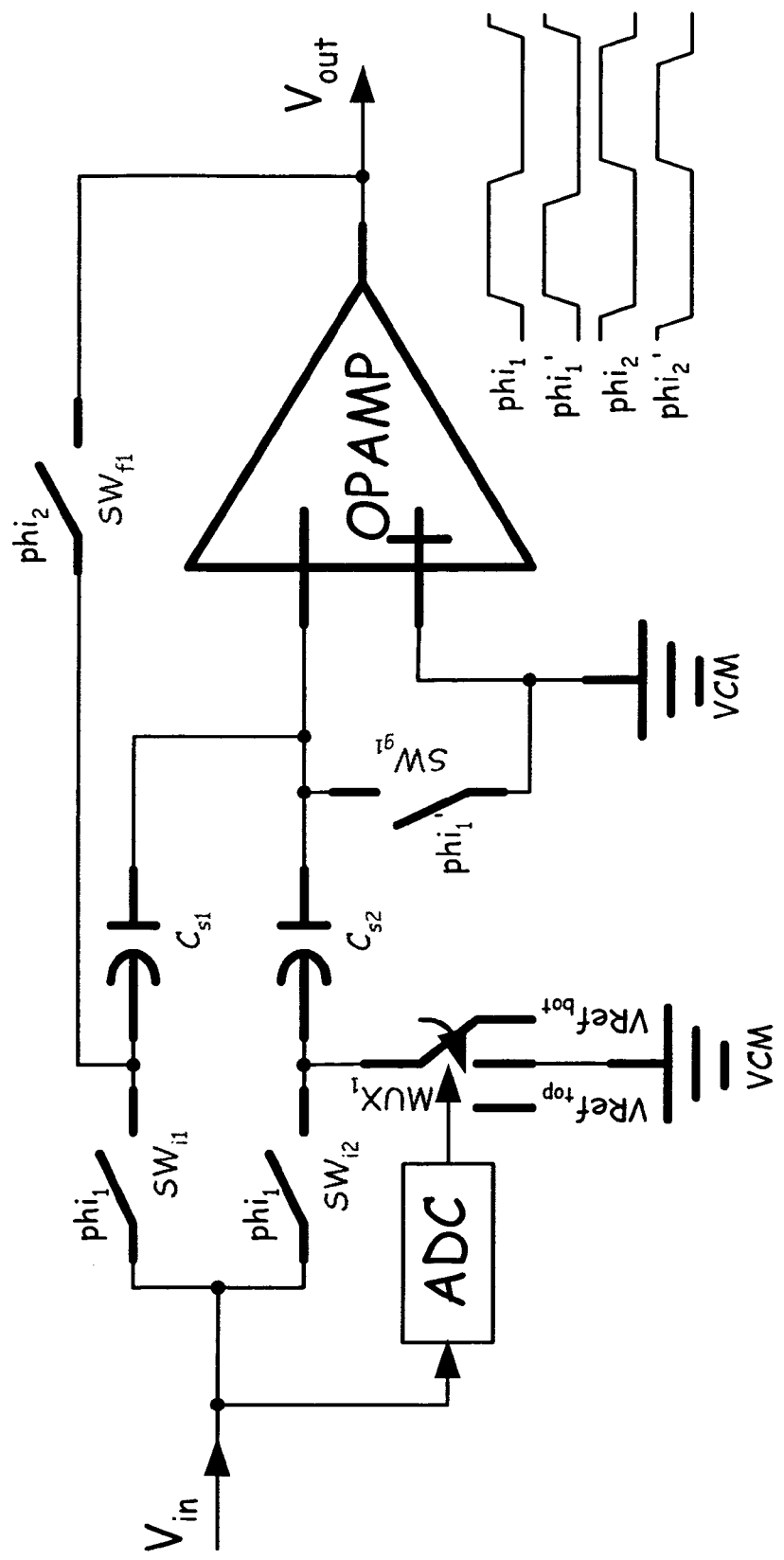
FIG. 3 is a schematic diagram illustrating a 1.5 bit single-ended pipelined ADC stage without DC-offset mitigation.
Figure 4:
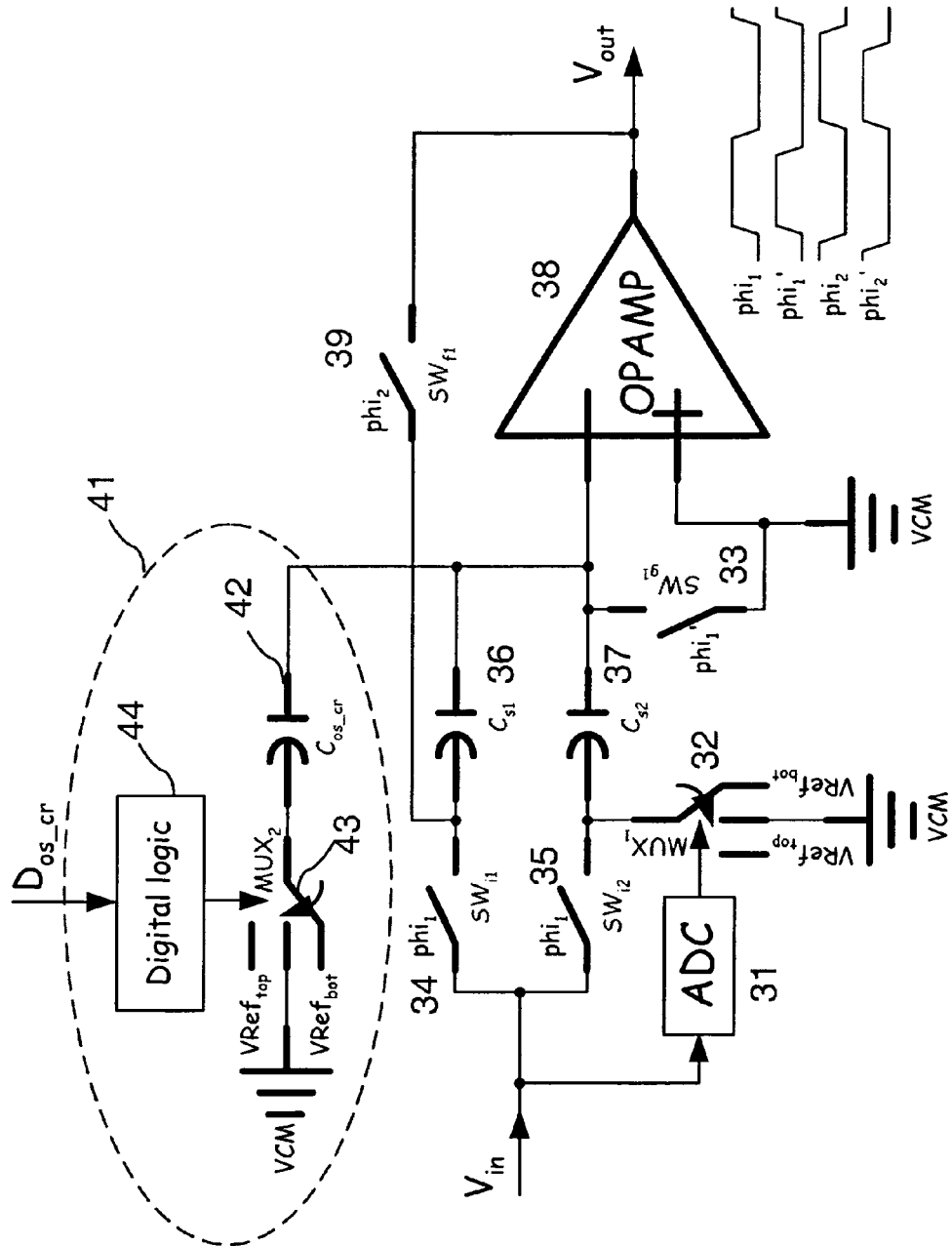
FIG. 4 is a schematic diagram illustrating an ADC stage with DC-offset mitigation in one example.

Corresponding to the block diagram given in FIG. 2, a single ended version circuit diagram for a 1.5-bit pipelined ADC stage is shown in FIGS. 3 and 4. FIG. 3 is a simplified schematic illustrating a conventional single-ended ADC without DC mitigation. FIG. 3 shows a conventional 1.5-bit pipelined ADC stage using the single-ended switched capacitor circuit as an implementation example of the conventional pipelined ADC stage shown in FIG. 2A. Functionally, the capacitors (Cs1 36 and Cs 2 37) and the switches (SWi1 34, SWi2 35, and SWf1 39) together serve as a "switched capacitor" sample and hold block and a gain block that are corresponding to the sample-and-hold block 20 and the gain block 23 in FIG. 2A. The multiplexer MUXI 32 implements the function of the DAC 22 in FIG. 2A.

FIG. 4 is a simplified schematic illustrating a 1.5-bit pipelined ADC stage including DC-offset mitigation according to an embodiment of the present invention. A DC-offset mitigation circuit has been incorporated to a conventional ADC stage same as the circuitry shown in FIG. 3. Compared to FIG. 3, the additional circuits, circled and marked as block 41, may provide the DC-offset adjustment with the rest of the circuit being the same as shown in FIG. 3. This pipelined ADC stage may perform the required DC-offset adjustment of up to 3 subtracted values. Functionally, the multiplexer $MUX_2$ block 43, capacitor $C_{os\_cr}$ block 42 and digital logic block 44 together serve as a switched capacitor DAC and a switched capacitor subtractor. For a given $D_{os\_cr}$, one can control the position of the multiplexer $MUX_2$ block 43 switch during clock phase $phi_1$ and $phi_2$ to obtain the following subtraction values: $[(VRef_{top}-Vcm) \times (Co_{os\_cr}C_{s1})]$, $[(VRef_{bot}-Vcm) \times (C_{os\_cr}/C_{s1})]$, or 0, by charge redistribution. For example, with a $D_{os\_cr}$ equal to "01", the multiplexer $MUX_2$ 43 is switched to common-mode node $V_{cm}$ at sampling phase when ph1 is "high" and switched to $VRef_{top}$ at amplifying and holding phase when ph2 is "high". The input analog signal will be subtracted by the value $(VRef_{top}-Vcm)\times(C_{os\_cr}/C_{s1})$. Table 1 shows how to generate a "subtracted value" for a given $D_{os\_cr}$.

TABLE 1

| $D_{os\_cr}(S)$, $D_{os\_cr}(n)$ | MUX2 position at $phi_1$ | MUX2 position at $phi_2$ | Adjustment Values $V_{os\_cr}$ |
|---|---|---|---|
| 0, 0 | Vcm | Vcm | (Vcm − Vcm) = 0 |
| 0, 1 | Vcm | $VRef_{top}$ | $(VRef_{top} - Vcm) \times (C_{os\_cr}/C_{s1})$ |
| 1, 0 | Vcm | Vcm | (Vcm − Vcm) = 0 |
| 1, 1 | Vcm | $VRef_{bot}$ | $(VRef_{bot} - Vcm) \times (C_{os\_cr}/C_{s1})$ |

In the first column of table 1, the first bit of the digital control code $D_{os\_cr}$, denoted $D_{os\_cr}(S)$, is a sign bit, and the second bit of the digital control code, denoted $D_{os\_cr}(n)$, is a control bit which determines whether to adjust a DC voltage at stage n. The second and third columns are the switch positions of the multiplexer MUX2 block 43 at $phi_1$ and $phi_2$, respectively. The fourth column shows the adjustment values $V_{os\_cr}$ in this pipelined ADC stage.

In a specific embodiment of the present invention, offset adjustment can be distributed into several stages, enabling a simple circuit implementation, higher offset adjustment resolution, and larger offset adjustment range. In one specific embodiment of the pipelined ADC stage architecture, the DC-offset adjustment inputs at different stages have different weighting factors. One can derive that the total DC-offset adjustment "$V_{inref\_os\_cr\_total}$" at ADC input is given by:

$$V_{\text{inref\_os\_cr\_total}} = \sum_{n=n_i}^{n_f} \left( \frac{V_{os\_cr}(n)}{\prod_{i=0}^{n} G(i)} \right) \quad \text{Eq. (1)}$$

where $n_i$ is the index for first ADC stage with the DC-offset adjustment, $n_f$ is the index for the last ADC stage with the last DC-offset adjustment, $V_{oscr}(n)$ is DC adjustment amount at stage n and G(i) is pipelined ADC stage gain at stage i. In the above equation, it is assumed that (1) there are N pipelined ADC stages, (2) stages $n_i$ (where $1 \leq n_i \leq N$) to $n_f$ (where $n_i \leq n_f \leq N$) are selected to implement the ADC adjustment circuitry. G(0) is equal to the gain value of the input sample-and-hold stage before the first stage of the pipelined ADC or 1 if there is no input sample-and-hold stage before the first stage of the pipelined ADC. Using Equation (1) above, a designer can select convenient $V_{os\_cr}(n)$, $n_i$ and $n_f$ values based on the DC-offset adjustment range and resolution requirements.

Figure 5:
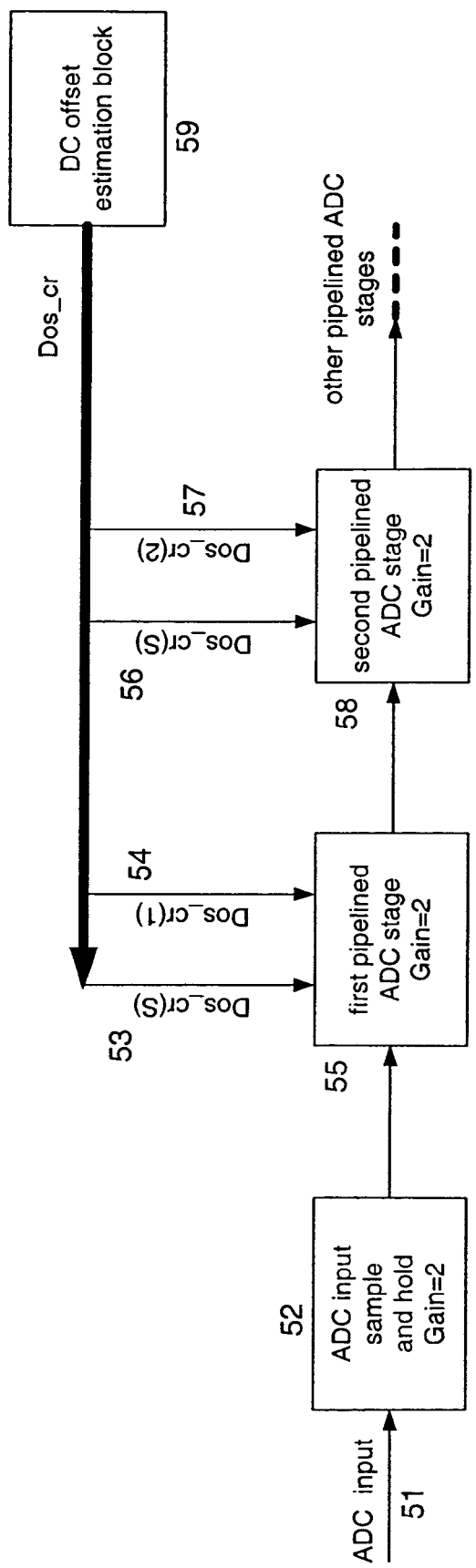
FIG. 5 is a schematic diagram illustrating a pipelined ADC with DC-offset mitigation in one example.

One 9-bit pipelined ADC design example with multistage offset adjustment according to a specific embodiment of the present invention is shown in FIG. 5. As shown in FIG. 5, an ADC input 51 is fed into an ADC input sample and hold circuit 52, which is coupled to a first pipeline ADC stage 55 which, in turn, is coupled to a second pipelined ADC stage 58. The first and second ADC stages can be implemented according to FIG. 4 and the descriptions above. Merely by way of an example, the following design values may be used in each ADC stage below: $VRef_{top}=1V$, $VRef_{bot}=-1V$, $Vcm=0V$, $C_{os\_Cr}=(\frac{1}{4})C_{s1}$, input sample-and-hold stage gain G(0)=2 before the first pipelined ADC stage, and each 1.5 bits pipelined ADC stage has a gain equal to 2. In addition, the DC-offset adjustment circuit may be included in both the first and the second 1.5-bit pipelined stages. The DC-offset signals are generated in the DC-offset estimation block 59, which sends signals $D_{os\_cr}(S)$ 53 and $D_{os\_cr}(1)$ 54 to the first ADC stage 55 and signals $D_{os\_cr}(S)$ 56 and $D_{os\_cr}(2)$ 57 to the second ADC stage 58. For the first pipelined ADC stage 55, the input referred DC-offset adjustment values $V_{inref\_os\_cr}(1)$ subtracted from the input of the whole ADC are shown in Table 2.

TABLE 2

| $D_{os\_cr}(S)$, $D_{os\_cr}(1)$ | Adjustment values $V_{os\_cr}(1)$ at the first ADC stage | ADC input referred DC-offset adjustment $V_{inref\_os\_cr}(1) = V_{os\_cr}(1)/4$ |
|---|---|---|
| 0, 0 | −0 | −0 |
| 0, 1 | −0.25 V | −62.5 mV |
| 1, 0 | +0 | +0 |
| 1, 1 | +0.25 V | +62.5 mV |

In the first column of table 2, the first bit of the digital control code $D_{os\_cr}$, denoted $D_{os\_cr}(S)$, is a sign bit, and the second bit of the digital control code, denoted $D_{os\_cr}(1)$, is a control bit which determines whether to adjust a DC voltage at first stage. The second column contains adjustment values $V_{os\_cr}(1)$ in this pipelined ADC stage. The third column shows the adjustment values referred to the whole ADC input, $V_{inref\_os\_cr}(1)$ Similarly, for the DC-offset adjustment circuit included in the second 1.5-bit pipelined ADC stage 58, the input referred DC-offset adjustment values $V_{inref\_os\_cr}(2)$, subtracted from the input of the whole ADC for various control bit values are shown in Table 3. The first column in Table 3 contains the values of two control bits: $D_{os\_cr}(S)$ and $D_{os\_cr}(2)$. Note that $D_{os\_cr}(S)$ is the same as that for the first ADC stage. The second column shows the adjustment values $V_{os\_cr}(2)$ at the second ADC stage. The third column shows the effective DC-offset adjustment referred to the input of the whole ADC.

TABLE 3

| $D_{os\_cr}(S)$, $D_{os\_cr}(2)$ | Adjustment values $V_{os\_cr}(2)$ at the second ADC stage | ADC input referred DC-offset adjustment $V_{inref\_os\_cr}(2) = V_{os\_cr}(2)/8$ |
|---|---|---|
| 0, 0 | −0 | −0 |
| 0, 1 | −0.25 V | −31.25 mV |
| 1, 0 | +0 | +0 |
| 1, 1 | +0.25 V | +31.25 mV |

Based on the adjustment values shown in the third columns of Tables 2 and 3, our design example allows for DC-offset compensation of ±93.75, ±62.5, ±31.25 and 0 mV. This is summarized in Table 4. In this specific embodiment, the whole 9-bit pipelined ADC example uses seven 1.5-bit ADC pipelined stages and one 2-bit last pipelined stage. The DC-offset adjustment circuitry is included in the first and second pipelined ADC stages.

Referring now to the functional block diagram is shown in FIG. 5, $D_{os\_cr}$ consisting of three bits, $D_{os\_cr}(S)$, $D_{os\_cr}(1)$, $D_{os\_cr}(2)$, is the digital representation for either $A_I$ or $A_Q$ originally shown in FIG. 1. The pipelined ADC stages are 1.5 bit per stage with a stage gain of 2. The gain of the sample and hold circuitry for each ADC stage is 2. Note that one needs to distribute to the first pipelined ADC stage the following two bits: $D_{os\_cr}(S)$ and $D_{os\_cr}(1)$. And one needs to distribute to the second-pipelined ADC stage the following two bits:

$D_{os\_cr}(S)$ and $D_{os\_cr}(2)$. Note there is a redundant representation in this example: either a ($D_{os\_cr}(S)$, $D_{os\_cr}(1)$, $D_{os\_cr}(2)$) of (0, 0, 0) or (1, 0, 0) will result in no DC-offset compensation. For all other pipelined ADC stages, there is no need to distribute the $D_{os\_cr}$ value as there is no additional circuitry added in those stages for DC-offset cancellation.

TABLE 4

| $D_{os\_cr}(S)$, $D_{os\_cr}(1)$, $D_{os\_cr}(2)$ | Adjustment values $V_{os\_cr}(1)$ at the first stage | Adjustment values $V_{os\_cr}(2)$ at the second stage | ADC input referred DC-offset adjustment $V_{inref\_os\_cr}$ total = $V_{os\_cr}(1)/4 + V_{os\_cr}(2)/8$ |
|---|---|---|---|
| 0, 0, 0 | −0 V | −0 V | −0 V |
| 0, 0, 1 | −0 V | −0.25 V | −31.25 mV |
| 0, 1, 0 | −0.25 V | −0 V | −62.5 mV |
| 0, 1, 1 | −0.25 V | −0.25 V | −93.75 mV |
| 1, 0, 0 | +0 V | +0 V | +0 V |
| 1, 0, 1 | +0 V | +0.25 V | +31.25 mV |
| 1, 1, 0 | +0.25 V | +0 V | +62.5 mV |
| 1, 1, 1 | +0.25 V | +0.25 V | +93.75 mV |

In the first column of Table 4, the first bit of the digital signal, $D_{os\_cr}(S)$, from the DC-offset estimation block is the sign bit to control all the DC-offset adjustment circuits, and the second bit, $D_{os\_cr}(1)$, and the last bit, $D_{os\_cr}(2)$, from the DC-offset estimation block are used to control the DC-offset adjustment circuit in the first and second pipelined ADC stage, respectively. The second column shows the adjustment values $V_{os\_cr}(1)$ in the first pipelined ADC stage. The third column shows the adjustment Values $V_{os\_cr}(2)$ in the second pipelined ADC stage. The fourth column shows the adjustment values referred to the whole ADC input, $V_{inref\_os\_cr\_total}$. As shown in Table 4, the total range of DC-offset adjustment is from −93.75 mV to +93.75 mV.

Although the example shows an implementation using two pipelined ADC stages, one skilled in the art can easily distribute the DC-offset adjustment into different number of pipelined ADC stages using Equation (1).

As noted above, embodiments consistent with the present invention may allow implementation of DC-offset adjustment with little additional hardware, one capacitor, and one multiplexer per ADC stage in some of the examples. The implementation may avoid additional time delay. In addition to a single-ended circuit design shown in FIGS. 3 and 4, the implementation in different embodiments may be single-ended or fully-differential.

Embodiments consistent with the present invention may be applicable to various types of communication systems or signal processing systems, including communication systems employing packet structures and OFDM waveforms noted above. The foregoing disclosure of embodiments consistent with the present invention has been presented for purposes of illustration and description. They are not intended to be exhaustive or to limit the scope of the invention. Many variations and modifications of the embodiments described herein will be apparent to one of ordinary skill in the art in light of the above disclosure. The scope of the invention is to be defined by the claims appended hereto and their equivalents.

Further, in describing representative embodiments of the present invention, the specification may have presented methods consistent with the present invention as a particular sequence of steps. However, to the extent that a method does not rely on a particular order of steps, the method should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to a method consistent with the present invention should not be limited to the performance of their steps in the order written, and one skilled in the art can readily appreciate that the sequences may be varied and still remain within the spirit and scope of the present invention.

What is claimed is:

1. A communication system capable of conducting DC-offset mitigation, the system comprising:
    an input analog-to-digital converter configured to receive an input signal and produce a digital signal from the input signal; and
    a DC-offset estimation device coupled with the input analog-to-digital converter, the DC offset estimation device being configured to produce a quantized DC-offset estimate and a residual DC off-set estimate based on the digital signal,
    wherein the input analog-to-digital converter is also configured to receive the quantized DC-offset estimate as a second input and to adjust a DC offset accordingly and wherein if the output of the input analog-to-digital converter contains a residual offset, the residual offset will be adjusted digitally using the residual DC off-set estimate, wherein the input analog-to-digital converter is a pipeline analog-to-digital converter comprising a plurality of analog-to-digital converter stages connected in a pipeline.

2. The communication system of claim 1, wherein the DC-offset estimation device estimates the DC offset from the digital signal during a transmission of a short training symbol provided by the digital signal.

3. The communication system of claim 1, wherein an analog-to-digital converter stage comprises:
    a sample-and-hold circuit configured to receive the input signal and to produce a sampled output;
    a gain amplifier coupled to the sample-and-hold circuit and configured to amplify the sampled output to produce an amplified output;
    a first analog-to-digital converter coupled to the sample-and-hold circuit and configured to produce a first digital output;
    a first digital-to-analog converter coupled to the first analog-to-digital converter and configured to produce a first analog output; and
    a summing node coupled to the gain amplifier and the first digital-to-analog converter, the summing node being configured to receive an analog DC-offset estimate and to subtract the first analog output and the analog DC-offset estimate from the amplified output to produce an adjusted output.

4. The communication system of claim 3, wherein the analog-to-digital converter state further comprises a second digital-to-analog converter coupled to the DC-offset estimation device and the summing node and configured to produce the analog DC-offset estimate from the quantized DC-offset estimate.

5. The communication system of claim 4, wherein the second digital-to-analog converter comprises a switched-capacitor digital-to-analog converter.

6. The communication system of claim 3, wherein the DC-offset estimation device is configured to provide the analog-to-digital converter stage a control signal configured to select a reference voltage level for a DC-offset adjustment at the analog-to-digital converter stage.

7. The communication system of claim 3, wherein the first digital output is provided as a digital signal, and the adjusted output is provided as an analog residual signal.

8. A local area network (WLAN) direct conversion device capable of conducting DC-offset mitigation, the device comprising:
- a base-band receiver;
- a local oscillator;
- a first signal-processing branch being coupled to an input, to the local oscillator, and to the base-band receiver;
- a second signal-processing branch being coupled to the input, to the local oscillator through a 90-degree phase shifter, and to the base-band receiver, wherein each of the first and second branches further comprises:
  - a mixer, coupled to the local oscillator;
  - a filter coupled to the mixer;
  - a variable gain amplifier coupled to the filter; and
  - an analog-to-digital converter coupled to the variable gain amplifier and the base-band receiver, wherein at least one of the analog-to-digital converters of the first and second branches comprises a plurality of pipelined analog-to-digital converters;
- a first DC-offset estimation circuit coupled to the first branch and the base-band receiver; and
- a second DC-offset estimation circuit coupled to the second branch and the base-band receiver.

9. The device of claim 8, wherein the first DC-offset estimation circuit receives an output signal from the analog-to-digital converter of the first branch and is configured to provide a digital offset code to the analog-to-digital converter of the first branch.

10. The device of claim 8, wherein the second DC-offset estimation circuit receives an output signal from the analog-to-digital converter of the second branch and is configured to provide a digital offset code to the analog-to-digital converter of the second branch.

11. The device of claim 8, wherein at least one of the first and second DC-offset estimation circuits is configured to provide a residual analog offset signal to the base-band receiver.

12. The device of claim 8, further comprising a subtractor for digitally canceling a residual DC offset.

13. A DC-offset mitigation method for a communication system, the method comprising:
- receiving an analog input signal;
- estimating a DC offset and a residual DC offset based from the analog input signal; and
- producing from the analog input signal an adjusted digital signal, the adjusted digital signal having been adjusted with the DC offset estimate and residual DC offset;
- producing DC-offset control signals for a plurality of analog-to-digital converter (ADC) stages;
- selecting DC-offset voltages for subtractions at the plurality of analog-to-digital converter (ADC) stages; and
- adjusting the input range at each of the plurality of analog-to-digital converter (ADC) stages to mitigate the DC offset.

14. The method of claim 13, wherein the estimating of the DC offset comprises computing an average of the analog-to-digital converter stages.

15. The method of claim 13, wherein selecting the DC-offset voltages further comprises:
- encoding the DC offset into a digital binary code; and
- separating the digital binary offset code into partial DC offset codes for the ADS stages.

16. The method in claim 13, wherein adjusting the input range comprises:
- applying a DC offset code to an analog-to-digital converter stage;
- selecting a correction voltage from a plurality of reference voltages;
- dividing the correction voltage by a predetermined factor; and
- subtracting the divided correction voltage from an input signal of the analog-to-digital converter stage.

* * * * *